United States Patent [19]

Hays et al.

[11] Patent Number: 4,800,014
[45] Date of Patent: * Jan. 24, 1989

[54] CATALYTIC CRACKING PROCESS

[75] Inventors: George E. Hays; Richard H. Nielsen; Chester O. Bowen; Floyd H. Holland, all of Bartlesville, Okla.

[73] Assignee: Phillips Petroleum Company, Bartlesville, Okla.

[*] Notice: The portion of the term of this patent subsequent to Mar. 11, 2003 has been disclaimed.

[21] Appl. No.: 790,580

[22] Filed: Oct. 23, 1985

Related U.S. Application Data

[62] Division of Ser. No. 557,552, Dec. 2, 1983, Pat. No. 4,562,046.

[51] Int. Cl.$^4$ ............................................. C10G 11/18
[52] U.S. Cl. .................................... 208/157; 208/153; 208/113; 422/140
[58] Field of Search .................... 208/153, 157–164, 208/113; 422/140, 143, 144–146; 239/132.5, 132.3, 427.5, 431

[56] References Cited

U.S. PATENT DOCUMENTS

| | | | |
|---|---|---|---|
| 2,654,658 | 10/1953 | Marshall, Jr. ....................... | 422/140 |
| 2,985,517 | 5/1961 | Harper ............................ | 208/164 X |
| 3,152,065 | 10/1964 | Sharp et al. ..................... | 208/153 X |
| 3,161,582 | 12/1964 | Wickham . | |
| 3,239,205 | 3/1966 | Metz ................................ | 239/132.3 |
| 3,243,265 | 3/1966 | Annesser ........................ | 23/288 |
| 3,894,936 | 7/1975 | Owen ............................. | 208/164 |
| 4,097,243 | 6/1978 | Bartholic ........................ | 23/288 S |
| 4,345,992 | 8/1982 | Washer et al. ................. | 208/153 X |
| 4,502,046 | 12/1985 | Hays et al. ..................... | 422/140 |
| 4,563,334 | 1/1986 | Hays et al. ..................... | 422/140 |
| 4,564,502 | 1/1980 | Skraba .......................... | 422/140 |
| 4,575,414 | 3/1980 | Skraba .......................... | 208/157 |

FOREIGN PATENT DOCUMENTS 0000433 1/1979 European Pat. Off. .

Primary Examiner—Glenn Caldarola
Attorney, Agent, or Firm—Williams, Phillips & Umphlett

[57] ABSTRACT

A mixing chamber for catalyst and oil in a catalytic cracking unit in which atomized oil is introduced preferably axially in a preferably vertically oriented transfer line or riser reactor from an atomization chamber segregated from flow of cracking catalyst. The cracking catalyst flows with a radially inward component to the mouth of the riser from the circumference thereof and mixes with the oil feed.

15 Claims, 3 Drawing Sheets

CATALYTIC CRACKING PROCESS

BACKGROUND OF THE INVENTION

This application is a division of application Ser. No. 557,552, filed Dec. 2, 1983, now U.S. Pat. No. 4,562,046.

In one aspect, the invention relates to a catalytic cracking unit. In another aspect, the invention relates to feeding materials to the riser or transfer line in a fluid catalytic cracking unit.

High boiling oils are difficult to catalytically crack to gasoline range product in existing catalytic cracking operations. There are several reasons for this. The deposition of large amounts of coke on the catalyst will frequently bring the unit up to its coke burning capacity. Coke presursors are mole abundant in high boiling oils. Coke laydown is also caused by the deposition of metals on the cracking catalyst that increase the coking tendencies of the catalyst. The troublesome metals become concentrated in the high boiling oils. Coke laydown to a large extent is also influenced by poor vaporization of the oil prior to contact with the catalyst. High boiling oils are difficult to vaporize. Poor mixing between the cracking catalyst and oil feedstock also contributes to coke laydown on the catalyst, as poor mixing can lead to localized high catalyst:oil ratios and overcracking.

Heavy oils include heavy gas oils which generally boil from about 600° F. to 1200° F., and components such as topped crudes and residuum which frequently have an initial boiling point in excess of 850° F. and an end boiling point in excess of 1200° F. Generally speaking, heavy oils will have an initial boiling point in excess of 500° F. and a 90% overhead point in excess of 1000° F. Heavy gas oils and residuums are especially difficult to crack to valuable products because their boiling point makes satisfactory vaporization very difficult, their viscosity complicates handling and further complicates vaporization, metal contaminant concentration is usually quite high, the hydrogen:carbon ratio is quite low and the concentration of carbon producing components such as polycyclic aromatics, asphaltenes and the like is very high. Feeds which contain components which have a boiling point in excess of 1050° F.+ are generally considered to be very poor fluid catalytic cracking feeds due to poor conversion to gasoline and lighter components, high coke production and excessive temperature levels in the regenerator.

Heavy oils can be successfully cracked to desirable products where they have been vaporized prior to contact with the catalyst and the catalyst:oil ratio is carefully controlled. With conventional feeds, vaporization is achieved by radiant energy transfer from the hot cracking catalyst to the feed droplets. This type of vaporization mechanism is satisfactory for oils boiling below thermal cracking temperatures which commence at about 850° F. For heavy oils, however, vaporization by radiant energy transfer is unsatisfactory due to the onset of thermal cracking and coke formation prior to complete vaporization. Coke laydown is worsened where liquid oil strikes the hot catalyst particles. It would be clearly desirable to provide an apparatus and process to mitigate contact between hot catalyst and liquid oil feed in a catalytic cracking unit.

OBJECTS OF THE INVENTION

It is an object of this invention to provide an apparatus and method for vaporizing a heavy oil feed for a catalytic cracking unit.

It is another object of this invention to provide a method and apparatus for mixing a cracking catalyst and an oil feed in a catalytic cracking unit.

Another object of this invention apparatus and method to insure dilute phase contact between the catalyst and the oil feed in the catalytic cracking unit without slugging or localized dense phase contact.

It is a further object of this invention to provide a method and apparatus well adapted for fulfilling those objects enumerated above.

SUMMARY OF THE INVENTION

In one aspect, there is provided according to the present invention a mixer for a riser or transfer line reactor. The apparatus comprises a catalyst lift pot having a longitudinal axis, an upper end, a lower end, and an interior surface, and a riser reactor connected to the upper end of the catalyst lift pot. The riser reactor has an upper end and a lower end and the lower end of the riser reactor defines a mouth which has a first diameter. A tubular member extends into the lift pot from the lower end of the lift pot. The tubular member has a longitudinal axis, an upper end, an exterior surface, and an interior. There is provided a means for introducing a first material generally longitudinally into the lower end of the riser reactor from the tubular member and a means for introducing a second material into the lower end of the riser reactor from at least substantially the entire circumference of the first diameter from between the tubular member and the lift pot. Where the oil feed is introduced axially into the riser reactor, the hot cracking catalyst can be flowed into the oil stream from substantially its entire circumference. By atomizing the oil in the tubular member, contact between hot cracking catalyst and liquid oil droplets can be greatly reduced. By regulating the vertical velocity component of the radially inward flow of cracking catalyst into the oil stream so that it is near the vertical velocity of the oil stream substantially plug flow between cracking catalyst and oil feed can be achieved at the point of mixing to further reduce the probability of contacting liquid oil feed with hot cracking catalyst. By fluidizing the catalyst prior to introducing it into the mouth of the riser reactor dilute phase mixing between the catalyst and oil can be achieved to reduce the possibility of catalyst slugging. These advantages can be readily achieved according to certain other aspects of the present invention by a process which comprises introducing one of the oil feed and the fluidized particulate catalyst generally axially into the mouth of the riser reactor and introducing the other of the oil feedstock in the fluidized particulate catalyst into the mouth of the riser reactor from substantially the entire circumference of the mouth of the riser. By fluidizing the cracking catalyst prior to introducing it into the riser, its vertical velocity component can be adjusted to be about the same as the vertical velocity of the oil feed. In this manner, slippage between hot cracking catalyst and the oil feed can be greatly reduced and thus the probability of oil striking hot cracking catalyst particles.

DETAILED DESCRIPTION OF THE INVENTION

Figure 1:
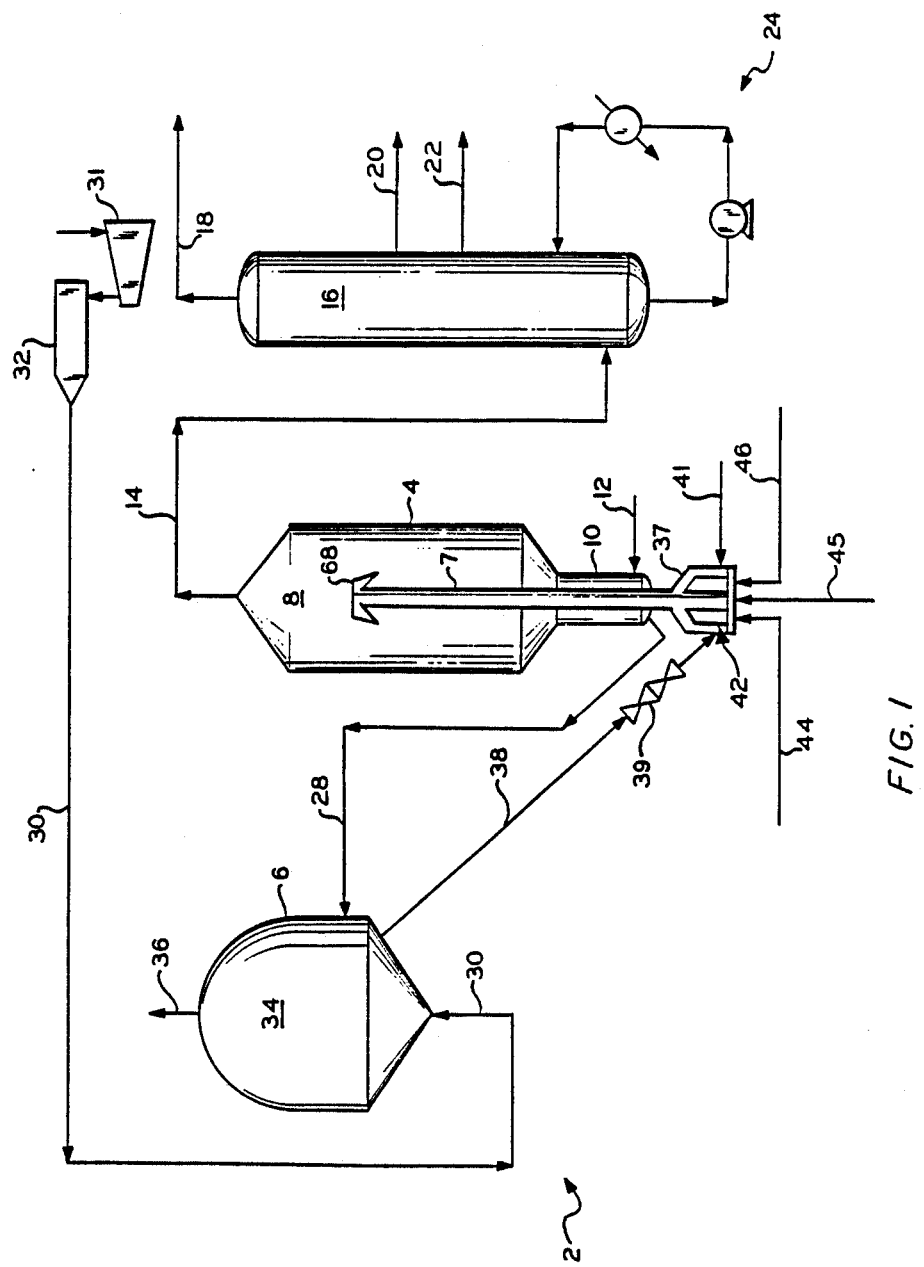
FIG. 1 illustrates schematically certain features of one type of catalytic cracking unit.

With reference to FIG. 1, one type of fluid catalytic cracking unit (FCCU) 2 comprises a reactor 4 and a regenerator 6. The reactor 4 comprises a riser reactor or transfer line reactor 7, a catalyst/product separation zone 8 which usually contains several cyclone separators, and a stripping section or zone 10 in which gas, usually steam such as introduced from line 12, strips entrained hydrocarbon from the coked catalyst. Overhead product from the separation zone 8 is conveyed via line 14 to a separation zone 16 such as the main fractionator where it is separated, for example, into light hydrocarbons which are withdrawn from the zone 16 by the line 18, gasoline range liquids which are withdrawn by the line 20, distillates which are withdrawn by the line 22, and slurry oils, cycle oils, unreacted feed and the like which can be recycled in the recycle means 24 as required.

After being stripped in the zone 10, the cracking catalyst is conveyed from the zone 10 to the regenerator 6 by line 28 for coke burnoff. In the regenerator 6, oxygen containing gas is introduced by a line 30 which is connected to a source of oxygen containing gas such as the air compressor 31 and heater 32. Coke deposits are burned from the catalyst in the regenerator 6 forming an effluent gas which is separated from the catalyst in a separation portion 34 of the regenerator 6 which usually contains a plurality of cyclone separators. These flue gases are withdrawn from the regenerator 6 by the line 36. Hot regenerated catalyst passes from the regenerator 6 to a lift pot 37 at the lower end of the riser reactor 7 by line 38, which provides a source of hot cracking catalyst particles for the riser reactor.

The catalyst flow rate through the cracking unit is controlled by valves 39 which are positioned in the line 38, preferably in a vertical portion thereof.

In the lift pot 37, catalyst from the line 38 is fluidized with a fluidizing gas, usually steam, which is introduced into the lift pot 37 by line 41. The oil feedstock is introduced into the lift pot 37 via a nozzle cartridge assembly 42 which preferably emits a fine mist axially into the riser or transfer line reactor at the lower end thereof. A line 44 connects the nozzle cartridge assembly 42 with a source of heavy oil feedstock in the most preferred embodiment, although the invention can also be used to crack exclusively light oils if desired. A line 45 can then connect the nozzle cartridge assembly with a source of light gas oil, or the like. Atomizing gas such as steam can be added to the nozzle cartridge assembly 42 by line 46 which connects the nozzle cartridge assembly to a steam source.

The operating conditions for the riser reactor 7 and regenerator 6 can be conventional. Usually, the temperature in the riser reactor 7 will be in the range of from about 850° to about 1050° F. The oil is usually admixed with steam at a weight ratio of oil to steam in the range of from about 6:1 to about 25:1. A catalyst oil weight ratio employed in the riser reactor 7 is generally in the range of from about 2:1 to about 30:1, usually between about 5:1 and about 15:1. Pressure in the riser reactor 7 is usually between about 15 and about 60 psia (pounds per square inch absolute). The cracking catalyst particles generally have a size in the range of from about 20 to about 200 microns, usually between about 40 and 80 microns. Flow velocity upward in the vertical section of the riser reactor is generally from about 10 to 30 feet per second in the lower portions and up to between about 40 and about 120 feet per second in the upper portions. The contact time between the catalyst and oil in the riser reactor is generally in the range of from about 1 to about 4 seconds, usually from 1.5 to about 3 seconds where the oil is injected into the bottom of the riser. The regenerator is operated at a temperature typically in the range of from about 1100° to about 1500° F. and is ordinarily provided with sufficient oxygen containing gas to reduce the coke on the catalyst to a level of about 0.5 weight percent or less, preferably less than 0.1 weight percent.

Catalysts suitable for catalytic cracking includes silica alumina or silica magnesia synthetic microspheres or ground gels and various natural clay-type or synthetic gel-type catalysts. Most preferably, fluidizable zeolite-containing cracking catalysts are employed. Such catalysts can contain from about 2 to about 20 percent based on total weight of zeolitic material, such as Y-zeolite, dispersed in a silica alumina matrix and have an equilibrium B.E.T. surface area in the range of 25–250 $m^2/g$ and a particle size chiefly in the range of 40 to 80 microns.

Figure 2:
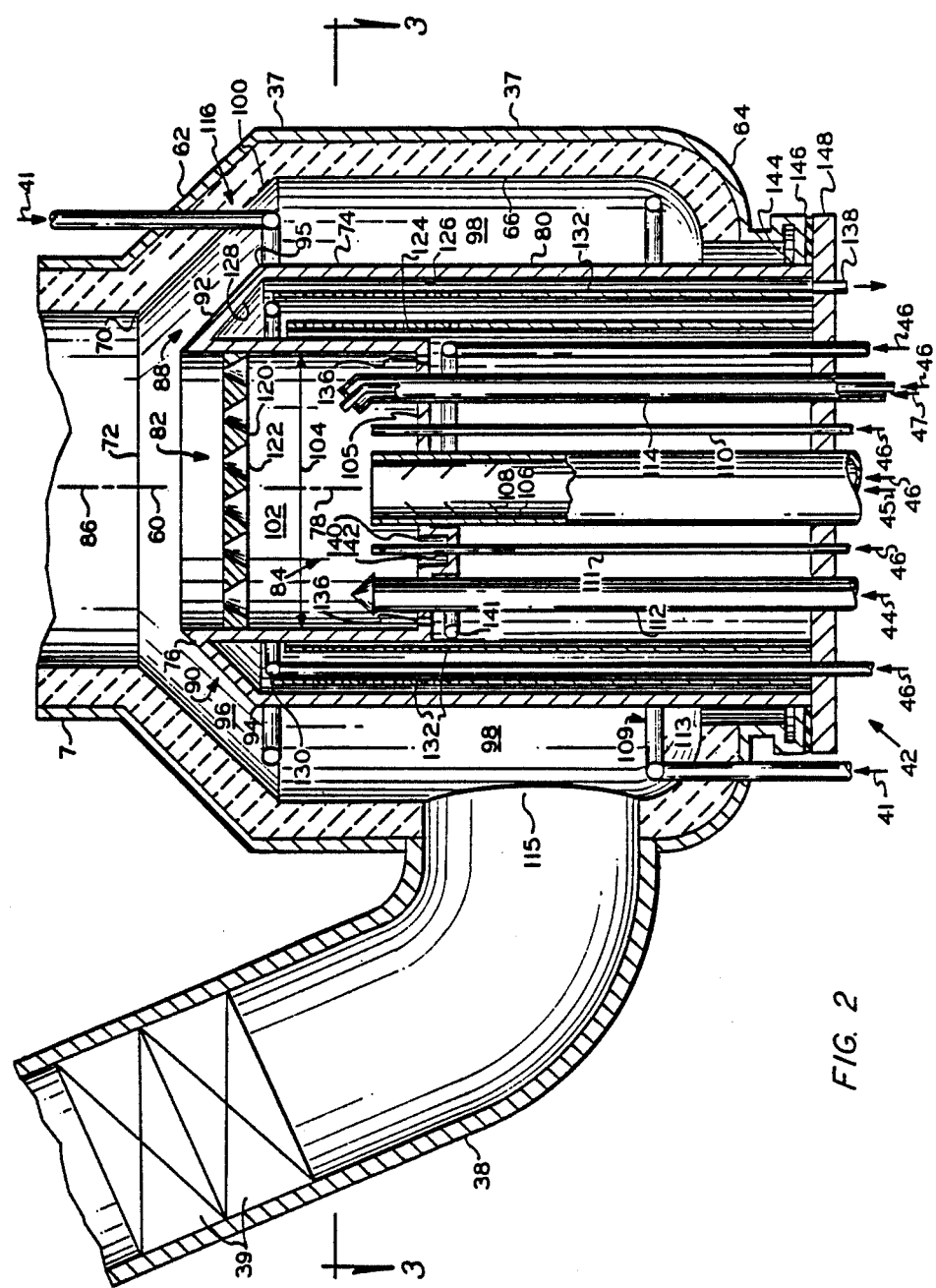
FIG. 2 illustrates schematically certain features of an embodiment of the present invention usefully employed in the system of FIG. 1.
Figure 3:
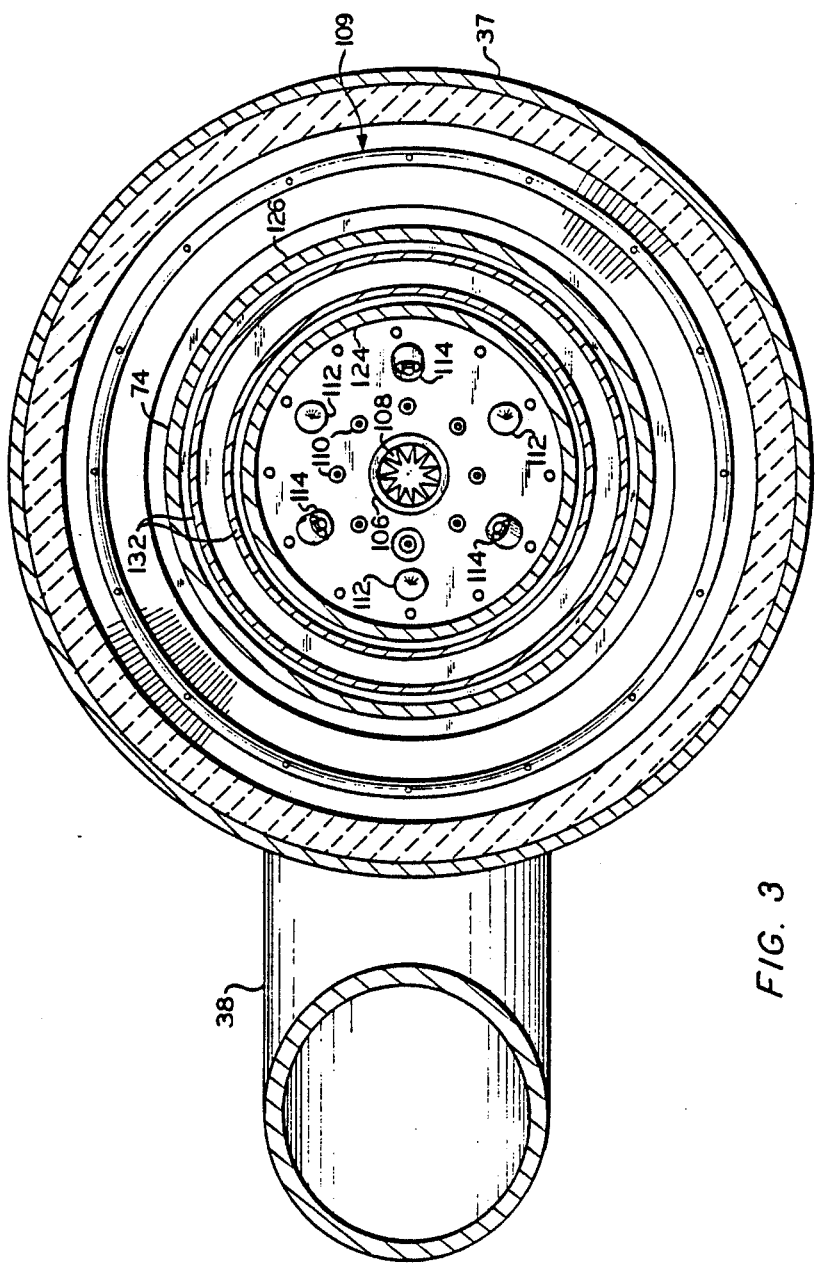
FIG. 3 schematically illustrates a cross section of the apparatus shown in FIG. 2 as would be seen when viewed along indicated lines 3—3.

Referring now particularly to FIGS. 2 and 3, the catalyst lift pot 37 has a longitudinal axis 60, an upper end 62, a lower end 64 and an interior surface 66. Usually, the interior surface 66 will be formed from refractory to resist rapid erosion from the hot catalyst. The riser reactor 7 has an upper end 68 in FIG. 1, a lower end 70 in FIG. 2, with the lower end 70 being connected to the upper end 62 of the lift pot. The lower end 70 of the riser reactor 7 forms a mouth to the riser reactor and defines a diameter illustrated by the numeral 72. The nozzle assembly 42 comprises a tubular member 74 extending into the lift pot 37 from the lower end 64 of the lift pot. The tubular member 74 has an upper end 76, a longitudinal axis 78, an exterior surface 80 and an interior 82 which can be as described in greater detail hereinafter. A means 84 is provided for introducing a first material generally axially into the lower end 70 of the riser reactor 7, along a longitudinal axis 86 thereof. A means 88 is provided for introducing a second material into the lower end 70 of the riser reactor 7 from at least substantially the entire circumference of the first diameter 72. Preferably, the first material comprises an oil feedstock and the means 84 for introducing the first material into the riser reactor 7 is connected to a source of oil feedstock such as via lines 44 and 45. The second material comprises a hot fluidizable cracking catalyst and the means 88 for introducing the second material into the lower portion 70 of the riser 7 is connected to a source of hot fluidizable cracking catalyst such as the regenerator 6 such as via the line 38.

Generally speaking, the means 88 forming the flow path for the hot fluidizable cracking catalyst includes a means 90 at the upper end 76 of the tubular member 74 for defining an upper surface 92 longitudinally spaced beneath the interior surface 66 at the upper end 62 of the catalyst lift pot 37. The upper surface 92 preferably defines a second diameter which can be as measured between points 94 and 95 which is larger than the first diameter 72. In this manner, a catalyst acceleration zone 96 can be defined between the upper surface 92 of the means 90 and the interior surface 66 of upper end 62 of the catalyst lift pot 37. Preferably, the upper end 76 of the tubular member 74 forms the means 90 and the second diameter, although these features could be formed by a flange or the end of a plug in a plug valve, for example.

Preferably, the exterior surface 80 of the tubular member 74 is generally cylindrical in shape and defines the second diameter although other shapes, such as frustoconical, would be very suitable. The interior surface 66 of the catalyst lift pot 37 also has a portion which is generally cylindrical and it defines a third diameter centered about the axis 60 which is preferably concentric with the diameter of the tubular member and the axis 78. In this manner, a catalyst lift chamber 98 is formed between the exterior surface 80 of the tubular member 74 and the interior surface 66 of the lift pot. Preferably, the catalyst lift chamber 98 has a generally annular cross section. The upper end 62 of the catalyst lift pot 37 is preferably formed by a wall 100 defining an inside surface which connects the generally cylindrical interior surface 66 of the catalyst lift pot 37 with the lower end 70 of the riser reactor. The upper end 76 of the tubular member 74 preferably defines a surface which is generally juxtaposed from the wall 100 and forms the means 90 for defining the upper surface longitudinally spaced beneath the upper end 62 of the catalyst lift pot 37. Preferably, the surface defined by means 90 is spaced beneath the inside surface defined by wall 100.

For ease of fabrication and good results, it is preferred that the inside surface of the wall 100 at the upper end 62 of the lift pot 37 connecting the generally cylindrical interior surface 66 of the catalyst lift pot 37 with the lower end 70 of the riser reactor 7 is generally frustoconical in shape. The inside surface of wall 100 preferably converges toward the longitudinal axis 86 of the riser reactor 7 at an angle as measured between the axis 86 and the inside surface of the wall 100 of between about 15 degrees and about 80 degrees. The surface 92 at the upper end 76 of the tubular member 74 is also preferably generally frustoconically shaped and converges toward the longitudinal axis 86 of the riser reactor 7 at an angle as measured between the longitudinal axis 86 and the surface 96 of between about 15 degrees and about 80 degrees. Preferably, the surfaces 96 and 100 converge toward the longitudinal axis 86 of the riser reactor 7 at an angle which is in the range of from about 30 degrees to about 75 degrees. The second diameter which is usually measured adjacent the upper end of the tubular member 74 is generally in the range of from about 1 to about 2 times the first diameter 72 defined by the lower end 70 of the riser. The radial inward component of catalyst velocity and vertical upward component of catalyst velocity can thus be determined easily by selection of the second diameter and the converging angle of the catalyst acceleration zone.

For atomization and vaporization of heavy oil feeds, the inside 82 of the tubular member 74 preferably forms a generally cylindrical atomization chamber 102. The chamber 102 is preferably provided with a fourth diameter 104 which is generally in the range of from about 0.3 to about 1.5, usually about 0.5 to about 1 times the diameter 72 at the mouth of the riser. The length of the atomization chamber 102 is preferably sufficient to provide an oil droplet size of below about 1000 microns. In practice, the desirable length as measured longitudinally for the chamber 102 will depend on steam and oil rates, oil viscosity, oil boiling point, nozzle type, and other parameters. Generally the length of the chamber 102 between the upper end 76 of the tubular member 74 and an atomization chamber end wall 105 spaced apart from the upper end 76 of the tubular member 74 is sufficient to provide the chamber 102 with a length to diameter ratio which is in the range of from about 1:10 to about 10:1, usually in the range of from about 1:3 to about 3:1. Pipes and tubular members which constitute nozzles preferably extend through the end wall 105 and empty into the atomization chamber 102 for supplying oil and atomization fluid into the chamber 102. Preferably, a central pipe 106 extends through the end wall 105 along the axis 78 thereof and empties into the atomization chamber 102. Turbulence generating members 108 which can be pentagonally shaped can desirably be mounted to the inside of the central pipe 106 for breaking up oil flow along the wall thereof where velocities are high enough to result in annular two-phase flow in the pipe 106. The central pipe 106 is preferably used to introduce gas oils into the chamber 102. A plurality of tubular members 110 can be circumferentially spaced apart around the central pipe 106 for emptying into the atomization chamber 102. Dispersal gas, usually steam, can be added into the chamber 102 through the tubular members 110. To achieve this, a source of atomizing fluid 46 can be connected to the tubular members 110. A source 45 of oil feedstock and a source of atomizing gas 46 can be connected to the central pipe 106. Other tubular members 112 and 114 can be circumferentially spaced apart around the central pipe 106 and extend longitudinally through the end wall 104 to empty into the atomization chamber 102. A source of oil feed 44 or 45 and/or atomizing gas 46 can be connected to these tubular members. In a preferred embodiment, the tubular members 112 carry a topped crude feedstock and are provided with a pressure atomizing nozzle. The tubular members 114 carry slurry oil in the outer tube and steam in the inner tube. The slurry oil is emitted generally axially from the outer tube through a C-shaped slot and is cut or sheared by steam from the inner tube flowing through a slot in the side of the inner tube which is normal to the opening at the end of the outer tube through which the slurry oil flows.

Preferably, the cracking catalyst is fluidized prior to being mixed with the oil feed. For catalyst aeration or fluidization a means 109 is positioned in the catalyst lift chamber 98 for distributing a fluidizing gas such as steam from steam source 41 into the catalyst lift chamber adjacent a lower end 113 of the catalyst lift chamber 98. The line 38 preferably empties into the lift pot 37 through a port 114 through the sidewall of the lift pot opening between the means 109 and the catalyst acceleration zone 96 adjacent the upper end 62 of the lift pot. The means 109 preferably distributes fluidizing gas in the lower portion of lift pot to start vertically upward flow of the cracking catalyst. More preferably, a second means 116 for distributing a fluidizing gas such as steam from the source 41 is positioned in the catalyst lift chamber 98 at a position adjacent the catalyst acceleration zone 96. Usually, the means 109 and 116 will each be formed from an annular distributor having a sidewall with a plurality of ports therethrough which connects its interior with circumferentially spaced apart positions in the catalyst lift chamber 98. The ports through the sidewall of the annular distributor constituting the means 109 can be oriented downwardly or upwardly to lift the catalyst introduced into the catalyst lift chamber 98 via port 115 to the annular distributor constituting the means 116. The ports through the sidewall of the second means 116 will generally be oriented toward the upper end of the riser reactor. In this manner, the cracking catalyst can be conveyed in dilute phase at a desired velocity into the mouth 70 of the riser 7.

For certain applications, it can be desirable to position a partition 120 having a plurality of apertures 122 extending through it across the tubular member 74 between the end wall 105 of the tubular member and the upper end 76 of the tubular member. When the partition 120 is present, it will define the upper end of the atomization chamber 102. The apertures 122 should be relatively small and the partition 120 should be relatively thick. For example, the partition 120 can have a thickness in the range of from about 0.5 to about 10 inches and at least a portion of the apertures can have a diameter in the range of from about 0.05 to about 5 inches. Preferably, the apertures 122 each have a throat and converge from inlet diameter on the side of the atomization chamber 102 which is in the range of from about 0.25 to about 5 inches to a throat diameter which is in the range of from about 0.1 to about 3 inches. Generally speaking, sufficient apertures 122 will be provided so that the total aperture throat cross-sectional area will be in the range of from about 0.05 to about 0.5 times the cross-sectional area of the atomization chamber 102.

For certain other applications, it can be desirable to hollow out the sidewall of the tubular member 74 such as by forming the tubular member 74 by an inner wall member 124, an outer wall member 126 and an end wall member 128. The inner wall member defines the third diameter 104, the outer wall member defines the fourth diameter which can be measured between points 94 and 95 and the end wall member 128 defines the upper end 76 of the tubular member. The end wall 105 of the atomization chamber 102 is defined by a closure across the inside diameter of the inner wall member 124 of the tubular member 74. The biggest advantage to hollowing out the sidewall of the tubular member 74 instead of forming it from a solid material such as refractory is that it can be cooled by a flow of cooling fluid. For example, a source of steam 41 can be connected to the annulus between the inner wall member 124 and the outer wall member 126 so that cooling fluid flows in the annulus by the outer wall member 126 and the end wall 128 which connects the inner wall member 124 and the outer wall member 128. One manner for doing this is to provide an annular fluid distributor 130 having a sidewall and a plurality of ports through its sidewall at spaced apart positions along its length connected to the fluid source 41 and positioned in the annulus between the inner wall 124 and the outer wall 126 at a position closely adjacent the end wall member 128. To further reduce heat penetration from the catalyst lift chamber 98 to the atomization chamber 102, one or more radiation shielding members or baffles 132 can be positioned between the inner wall member 124 and the outer wall member 126. The radiation shielding members 132 provide radiation shielding between the wall members to reduce heat penetration into the atomization chamber 102 and the possibility of coke buildup. The radiation shielding members 132 can be in the form of tubular baffles extending circumferentially around and longitudinally through the annulus between the inner and outer wall members and this arrangement is presently preferred. The tubular baffles 132 are provided with apertures which are preferably radially nonaligned as between adjacent baffles so as to prevent or mitigate heat penetration by radiation. Other types of radiation shielding, such as bronze turnings, raschig rings and the like can be employed if desired. The cooling fluid introduced into the annulus between the inner wall member 124 and the outer wall member 126 can be introduced or exhausted into the riser if desired, such as through a plurality of ports 136 which extend through the end wall 105 defining the lower end of the atomization chamber 102, or they can be withdrawn or exhausted from the cracking unit such as via tube or port 138 which also is positioned in flow communication with the annulus. To further assist in oil dispersal and to shield the inner wall member 124 from oil impingement the ports 136 can open into the atomization chamber 102 through the end wall 105 around the periphery of the atomization chamber 102 closely adjacent to the inner wall member 124, or the steam can leak into the atomization chamber 102 between the feed tubes 112 and 114 and the end wall 105.

To obtain maximal cooling benefit from the fluid introduced into the hollowed-out portion of the tubular member, it is desirable that the fluid first flow past the inner wall member 124 and then the outer wall member 126. To accomplish this, the baffle 132 can be formed as a generally tubular partition positioned in the annulus between the inner wall member 124 and the outer wall member 126 in a spaced-apart position from the end wall 128 at the upper end of the tubular member to form an inner flow path adjacent the inner wall member and an outer flow path adjacent the outer wall member. Communication between the inner flow path and the outer flow path is established adjacent the end wall 128. The source of cooling fluid such as steam source 46 is connected to a lower portion of the inner flow path such as at annular distributor 140.

In further aspects of the present invention, the flow of atomizing gas can be controlled independently of the flow of feed oil. In accordance with this embodiment, there is provided extending through the end wall 105 of the atomization chamber 102 a means for introducing an atomizing fluid consisting essentially of steam into the atomization chamber 102. Generally speaking the means for introducing steam will be formed by a plurality of ducts such as the tubular members 110 and/or the ports 136. Preferably, the ducts will open into the atomization chamber 102 in a geometric array which is concentric with the longitudinal axis 78 of the atomization chamber. Usually, the ducts will be arranged along a circle. In any event, the ducts are connected to the steam source 46 and some means for controlling the flow of steam through the ducts, such as a valve, is provided in the steam line.

In the event that liquid accumulation on the end wall 105 becomes a problem, a sump 140 can be recessed from the atomization chamber 102 into the end wall 105 of the atomization chamber 102 and the end wall 105 formed so that liquids accumulated thereon will flow into the sump 140. From the sump 140, accumulated liquids can be withdrawn from the cracking unit by means not shown or reatomized by a means associated with the sump 140 for atomizing accumulated liquids therein. In one embodiment, the means associated with the sump for atomizing accumulate liquids comprises a duct or port 142 opening into the sump 140 which is connected to the steam source 46 such as by a tubular member 111. Preferably, the tubular member 111 extends through the end wall 105 and into the atomization chamber 102 through the sump and has a sidewall which defines the port 142. The port 142 is located in the sump 140 so that liquids are aspirated out of the sump and emitted from the end of the tubular member in admixture with steam into the atomization chamber 102.

For maintenance purposes, it is very desirable that the assembly 42 be removable as a unit. One manner of providing for this is to form the lift pot 37 with a port 144 at its lower end adapted for receiving the generally cylindrical exterior surface 80 of the tubular member. A generally annular flange 146 is positioned around the port. The generally cylindrical exterior surface 80 of the tubular member is provided with a generally annular flange 148 mounted thereon sealingly contacting the generally annular flange 146 at the lower end of the lift pot.

According to certain further aspects of the present invention, there is provided a method for mixing a fluidized particulate catalyst and a liquid oil feedstock. The method comprises introducing one of the liquid oil feedstock and the fluidized particulate catalyst generally axially into the mouth of a riser reactor, and introducing the other of the liquid oil feedstock and the fluidized particulate catalyst into the mouth of the riser from substantially the entire circumference of the mouth of the riser. Preferably, the liquid oil feedstock is introduced generally axially into the mouth of the riser and the fluidized particulate catalyst is introduced into the mouth of the riser from substantially the entire circumference of the mouth of the riser. Usually, each of the liquid oil feedstock and the particulate catalyst will be in admixture with atomizing and fluidizing gas respectively, usually steam in both instances. In order to reduce the probability of liquid oil droplets from striking hot cracking catalyst particles, it is desirable that the liquid oil feedstock and catalyst particles merge together at about the same velocity. Therefore, the particulate catalyst is preferably introduced into the riser with an axial velocity component which is about the same as the axial velocity of the liquid oil feedstock, where axial refers to the axis of the riser or transfer line, which is preferably vertically oriented. In this manner, catalyst slippage at the point of mixing with the feedstock, that is, substantial slippage prior to vaporization of the feed, can be substantially prevented.

Preferably, the particulate catalyst comprises a fluid catalytic cracking catalyst which will have a particle size primarily in the range of from about 20 to about 200 microns, usually in the range of from about 40 to about 80 microns. The liquid oil feedstock will generally comprise a petroleum oil having boiling point in the range of from about 600° to about 1200°+ and be introduced into the riser so as to provide a catalyst:oil weight ratio in the range of from about 2.1 to about 20:1. The liquid oil feedstock is preferably introduced generally axially into the mouth of the riser from a generally cylindrical atomization chamber positioned in general axial alignment with the riser and the fluidized cracking catalyst is usually introduced into the mouth of the riser from a catalyst lift chamber annularly positioned around the atomization chamber and physically separated from the atomization chamber. The catalyst lift chamber empties into the mouth of the riser along the circumference of the mouth. In this manner, the oil feedstock can be introduced into the mouth of the riser in atomized form with the droplet size being less than 1000 microns, preferably principally in the range of from about 5 to about 500 microns, having been atomized by being sprayed into an atomization chamber axially aligned with the mouth of the riser. The fluidized cracking catalyst is flowed into the stream of atomized oil feedstock with a substantial radially inward velocity component from the periphery of the stream. Preferably, the fluidized cracking catalyst enters the stream of atomized oil feedstock at an acute angle of between about 45 degrees and about near 90 degrees with respect to the flow axis of the atomized oil feedstock. Preferably, steam is injected into the generally annularly shaped cloud of fluidized cracking catalyst slightly upstream of its entry into the mouth to both dilute and impart a radially inward velocity component to the cracking catalyst, since steam injection at this point can aid in forming a vortex of cracking catalyst particles and atomized oil feedstock traveling up the riser. By accelerating the catalyst in three stages, a uniform dilute phase of catalyst can be achieved. For example, the catalyst can be accelerated to 3–10 fps by the bottom steam ring, 5–15 fps by the top steam ring and 10–25 fps by the annular venturi.

Generally, the cracking catalyst will be introduced into the catalyst lift chamber at a temperature in the range of from about 1000° F. to about 1700° F. and the atomization and fluidization steam will be at a temperature in the range of from about 300° F. to about 1000° F. The oil will typically have been preheated to a temperature in the range of from about 200° F. to about 800° F.

At times, it can be desirable to flow the oil feedstock and atomizing gas through a partition positioned in axial alignment with the mouth of the riser. The partition when present has a plurality of apertures therethrough which function as venturis to provide better dispersion of the oil and steam and smaller droplet size. Steam can be used as the atomizing gas with a pressure ratio across the venturi high enough to give critical flow, for example, 2 or more. Where oil impingement coalesces on the bottom of the partition or the sidewall of the oil cartridge, it can be collected in a sump positioned at the bottom of the atomization chamber and reaspirated by a tube carrying atomizing gas for emission back into the atomization zone. To reduce the possibility of coke formations on the inside walls of the atomization chamber, the atomization chamber and catalyst lift chamber can be physically separated by a hollowed out wall and a cooling fluid circulated through the hollow wall. If desired, at least a portion of the cooling fluid can be withdrawn from the hollow wall and at least a portion of it injected into the atomization chamber. Preferably, the cooling fluid comprises steam in which event a stream of steam is injected into the atomization chamber separate from the liquid oil feedstock. If desired, a separate steam stream can be introduced into the atomization chamber alternatively or in addition to the steam entering the atomization chamber from the hollowed out wall. For good distribution of the separate steam streams, they can be introduced into the atomization chamber at circumferentially spaced apart positions in the chamber. One or more radiation shield members can be positioned in the hollow wall and the cooling fluid circulated around the radiation shield members to further reduce heat leak through from the catalyst lift chamber into the atomization zone.

The invention is illustrated by the following example.

EXAMPLE

The following illustrates how the invention might be used in a commercial unit. Using the equipment described in FIGS. 1, 2, and 3 the following specific conditions can be employed.

| Item | |
|---|---|
| (34) Regenerator diameter feet-inches (I.D.) | 45'-2" |
| (34) Regenerator length feet-inches | 67'-8" |
| (8) Reactor (disengager) diameter feet-inches (I.D.) | 26'-0" |
| (8) Reactor (disengager) length feet overall | 54'-0" |
| (7) Reactor riser diameter I.D. inches | 42" |
| (7) Reactor riser height feet-inches | 88'-6" |
| (37) Lift pot diameter feet-inches | 7'-0" |
| (37) Lift pot height overall feet-inches | 7'-11" |
| (38) Catalyst conduit diameter (I.D.) feet-inches | 2'-4" |
| (39) Catalyst slide valve diameter (I.D.) feet-inches | 2'-6" |

| Operating Conditions | Regenerator | Disengager | Reactor |
|---|---|---|---|
| Outlet temperature °F. | 1298 | 928 | |
| Dilute phase temperature °F. | 1312 | 900 | |
| Top pressure psia | 19.7 | 24.2 | |
| Riser inlet temperature °F. | | | 886 |
| Riser feed temperature °F. | | | 702 |
| Riser out temperature °F. | | | 951 |
| Reactor stripper temperature °F. | | 950 | |
| Stripping steam lb/hr | | 5500 | |
| Stripping steam lb/ton catalyst | | 7.2 | |
| Riser cat/oil ratio | | | 4.3 |
| Riser Velocity feet/sec | | | 50 |
| Residence time seconds | | | 1.8 |
| Catalyst circulation tons/min | | | 12.7 |
| Total regenerator air (SCFM) | 85,300 | | |
| Air blower discharge temperature °F. | 310 | | |
| Air blower discharge pressure psia | 38 | | |

| Fresh Feed Oil Charge Volumes and Temperatures BPD, °API °F. | BPD | °API | °F. |
|---|---|---|---|
| Virgin gas oil | 10,000 | 32.8 | 750 |
| Heavy cycle oil | 7,200 | 20.3 | 780 |
| Topped crude | 8,000 | 14.0 | 800 |
| Reslurry oil | 2,400 | 10.9 | 680 |
| Precipitator backwash | 1,200 | 10.8 | 480 |
| Total fresh feed | 28,800 | — | — |
| Steam, 125 psig, 500° F. | | | |
| To V. Gas oil preheater lb/hr | 4,000 | | |
| To slurry nozzle lb/hr | 1,000 | | |
| All other cartridge stm lb/hr | 13,000 | | |
| Total steam usage | 18,000 | | |

| Lift Pot | |
|---|---|
| Item | Dimension |
| (41) Two 3-inch sch. 160 304 S S. steam rings with 21 3/16 diameter steam holes | 5 ft-6 in OD |
| (42) Cartridge, outside refractory diameter overall height | 4 ft-4 in<br>9 ft-5¼ in |
| (82) Inside diameter (refractory) | 2 ft-10 in |
| (102) Length of chamber | 3 ft- 4 in |
| (44) 3 Heavy cycle and topped crude feed pipes nom. sch 80 typical | 4 in |
| (45) 1 Virgin gas oil feed pipe nom sch 80 | 10 in |
| (46) Dispersion steam pipes and rings 1½ inch sch. 80 with 2 ft-8 in diameter ring of 1½-inch sch. 80 with 60-3/16 inch steam holes. | 1½ in |
| (47) 3 Reslurry oil and separator backwash feed lines 4 in sch. 80 nom. diameter with interior steam pipe of 2½ in diameter sch. 160 typical | 2½ in O.D. inside<br>4 in I.D. |
| (66) Lift pot interior refractory surface | 6 ft 3 in I.D. |
| (70) Lower end of riser interior refractory I.D. | 42 in |
| (76) Upper end of cartridge rounded with ½ inch radius, with ⅛ inch outer layer of Stellite #1 over a ⅛ inch inner layer of Stellite #6 over a nosing bar | As described |
| (88) Annular throat for catalyst with inlet horizontal distance of 11½ inches and outlet of horizontal distance 4 inches width (Catalyst acceleration zone 96 defined between upper surface 92 of means 90 and surface 66 of upper end 62 and catalyst lift pot 37. Surface 92 as measured between points 94 and 95 which is larger than diameter 72) | inlet (lower) 11½ in<br>outlet (upper) 4 in |
| (98) Catalyst lift chamber, annular width with annulus circumferential 360° around cartridge | 11½ in |
| (105) Circular plate steel | 1 in thick |
| (108) Turbulence generating members welded at 15° angle to axis and pentagonally shaped with overall dimensions of 1¼ inch by 2 inch with four rows of deflectors, 16 deflectors per row, rows are staggered | |
| (110) Dispersal steam pipes of 1 to 1½ inch nominal pipe diameter | |
| (112) Tubular member 4 inch nom. diameter (same as 114) | |
| (114) Tubular member 4 inch nom diameter both circumferentially spaced apart 11 3/16 inch radius to center lines from central pipe 106 and extended 6 inches into chamber 102 | |
| (120) Venturi partition 2 ft 10 inches in diameter, 2 inches thick with frustoconical apertures | |
| (122) 2 inch diameter converging to 1 inch diameter | |
| (130) Perforated steam ring 2 inch sch. 80 3 feet 7 inches in diameter | |
| (132) 2 Radiation shielding baffle members, perforated ⅜ inch thick steel plates cylindrical shaped, ½ inch diameter holes, 4-inch center line distance between holes, plates are 1 inch apart, holes are misaligned | |
| (136) Steam leaks nominally ½ to 1 inch diameter | |
| (140) 1½ inch annular steam distributor ring 2'-6" diameter | |
| (142) 1 inch port in conduit 111 which has 1½ I.D. | |
| (148) 5 feet-5 inches diameter flange 4 inches thick carbon steel with 60-1⅜ inch diameter holes on a 60 inch bolt circle | |

What is claimed is:

1. A method for mixing a fluidized particulate catalyst and a liquid oil feedstock comprising:
    introducing a stream of the liquid oil feedstock in admixture with an atomizing fluid generally axially into the mouth of a riser reactor from an atomization chamber generally in axial alignment with the riser; and
    introducing the fluidized particulate catalyst into the mouth of the riser from substantially the entire circumference of the mouth of the riser, wherein the fluidized particulate catalyst is introduced into the mouth of the riser from a catalyst lift chamber annularly positioned around the atomization chamber and physically separated from the atomization chamber, and wherein the fluidized particulate catalyst flows into the oil feedstock with a substantially radially inward velocity component from the periphery of the stream of oil feedstock.

2. A method as in claim 1 wherein the liquid oil feedstock is introduced generally axially into the mouth of the riser in admixture with an atomizing gas and has a first axial velocity component along the axis of the riser and the fluidized particulate catalyst is introduced into the mouth of the riser in admixture with fluidizing gas from substantially the entire circumference of the mouth of the riser with a second axial velocity component along the axis of the riser about the same as the first axial velocity component.

3. A method as in claim 2 wherein the fluidizing gas comprises steam, wherein the atomizing gas comprises steam, wherein the particulate catalyst comprises a fluid catalytic cracking catalyst having a particle size primarily in the range of about 20 to about 200 microns, and wherein the oil feedstock comprises a petroleum oil having an initial boiling point of over 500° F. and an end boiling point in excess of 1000° F. and the oil and catalyst are introduced into the riser so as to provide a catalyst:oil weight ratio in the range of about 2:1 to about 30:1.

4. A method as in claim 3 wherein the cracking catalyst is introduced into the catalyst lift chamber at a temperature in the range of 1000° F.-1700° F., and wherein the atomization and fluidization steam is at a temperature in the range of 300° F.-1000° F.

5. A method as in claim 4 wherein the oil feedstock is introduced into the mouth of the riser in atomized form with a droplet size principally in the range of 4 to about 500 microns, said oil feedstock having been atomized by being sprayed into the atomization chamber axially toward the mouth of the riser.

6. A method as in claim 5 wherein the fluidized cracking catalyst enters the stream of atomized oil feedstock at an acute angle of between about 45 degrees and near 90 degrees with respect to a flow axis of the atomized oil feedstock.

7. A method as in claim 5 further comprising injecting steam into the fluidized cracking catalyst to impart a radially inward velocity component thereto.

8. A method as in claim 2 further comprising flowing the oil feedstock and atomizing gas through a partition positioned in axial alignment with the mouth and substantially orthogonal to the axis of the riser, said partition having a plurality of apertures therethrough.

9. A method as in claim 1 further comprising collecting coalesced liquid oil feedstock in a sump positioned in the bottom of the atomization chamber, aspirating the coalesced liquid oil feedstock into a tube carrying atomizing gas, and emitting an atomized mixture of oil feedstock and atomizing gas into the atomization chamber.

10. A method as in claim 1 wherein the atomization chamber and catalyst lift chamber are physically separated by a hollow wall, said method further comprising circulating a cooling fluid through the hollow wall.

11. A method as in claim 10 further comprising withdrawing at least a portion of the cooling fluid from the hollow wall and injecting said at least a portion of cooling fluid into the atomization chamber.

12. A method as in claim 11 further comprising circulating the cooling fluid through a multiplicity of radiation shield members positioned in the hollow wall.

13. A method as in claim 5 further comprising introducing a steam stream into the atomization chamber as a stream separate from the oil feedstock.

14. A method as in claim 13 further comprising introducing a plurality of separate steam streams into the atomization chamber at circumferentially spaced apart positions into the atomization chamber.

15. A method as in claim 1 wherein the liquid oil feedstock and atomizing fluid are released from nozzles which empty into the atomization chamber.

* * * * *

UNITED STATES PATENT AND TRADEMARK OFFICE
CERTIFICATE OF CORRECTION

PATENT NO. : 4,800,014

DATED : January 24, 1989

INVENTOR(S) : George E. Hays et al

It is certified that error appears in the above-identified patent and that said Letters Patent is hereby corrected as shown below:

Column 14, claim 7, line 3, "5" should read --6--.

Signed and Sealed this

Twenty-third Day of January, 1990

*Attest:*

JEFFREY M. SAMUELS

*Attesting Officer*    Acting Commissioner of Patents and Trademarks